United States Patent
Nishanov et al.

(10) Patent No.: US 10,169,097 B2
(45) Date of Patent: Jan. 1, 2019

(54) DYNAMIC QUORUM FOR DISTRIBUTED SYSTEMS

(75) Inventors: Gor Nishanov, Redmond, WA (US);
Andrea D'Amato, Kirkland, WA (US);
Amitabh Prakash Tamhane, Redmond, WA (US); David A. Dion, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1183 days.

(21) Appl. No.: 13/356,274

(22) Filed: Jan. 23, 2012

(65) Prior Publication Data
US 2013/0191453 A1 Jul. 25, 2013

(51) Int. Cl.
*G06F 15/16* (2006.01)
*G06F 9/50* (2006.01)

(52) U.S. Cl.
CPC ...... *G06F 9/5061* (2013.01); *G06F 2209/505* (2013.01)

(58) Field of Classification Search
CPC ............... G06F 11/1425; G06F 11/181; G06F 11/2028; G06F 11/182; G06Q 10/06; G06Q 10/1097; H04L 41/0672; H04L 41/0873; H04L 67/24
USPC ........................................................ 709/204
See application file for complete search history.

(56) References Cited

U.S. PATENT DOCUMENTS

| | | | |
|---|---|---|---|
| 5,828,889 A * | 10/1998 | Moiin et al. ................. | 710/240 |
| 5,948,109 A * | 9/1999 | Moiin et al. .................. | 714/4.4 |
| 6,192,401 B1 | 2/2001 | Modiri et al. | |
| 6,243,744 B1 * | 6/2001 | Snaman et al. ............... | 709/220 |
| 6,662,219 B1 | 12/2003 | Nishanov et al. | |
| 6,862,613 B1 * | 3/2005 | Kumar et al. ................ | 709/220 |
| 6,938,084 B2 | 8/2005 | Gamache et al. | |
| 7,478,263 B1 | 1/2009 | Kownacki et al. | |
| 7,644,305 B2 | 1/2010 | Friedrich et al. | |
| 7,870,230 B2 | 1/2011 | Rao et al. | |
| 8,578,204 B1 * | 11/2013 | Ortenberg ........... | G06F 11/1425 714/2 |
| 2002/0023220 A1 * | 2/2002 | Kaplan ............... | H04L 63/0823 713/176 |
| 2007/0294363 A1 * | 12/2007 | Friedrich et al. ............. | 709/217 |
| 2008/0184061 A1 * | 7/2008 | Tripathi et al. ................ | 714/4 |
| 2008/0250421 A1 | 10/2008 | Basavaraja et al. | |
| 2009/0084837 A1 * | 4/2009 | Kalech ................... | G07C 13/00 235/51 |
| 2009/0307065 A1 * | 12/2009 | Kincaid .......................... | 705/12 |
| 2010/0017644 A1 * | 1/2010 | Butterworth ..................... | 714/4 |
| 2011/0161423 A1 * | 6/2011 | Pratt et al. .................... | 709/205 |

(Continued)

OTHER PUBLICATIONS

Booster WWW Project; Simplified Rules of Order, Procedures Used in Meetings; Oct. 8, 2002; 2 pages.*

(Continued)

*Primary Examiner* — Oleg Survillo
(74) *Attorney, Agent, or Firm* — Workman Nydegger

(57) ABSTRACT

Managing a distributed system. Embodiments may allow for a quorum to dynamically change the quorum vote. One example is illustrated in a method. The method includes determining a change to a voter's level of participation in a cluster. A quorum of voters changes the voter's voting privileges, based on the change in the voter's level of participation.

20 Claims, 2 Drawing Sheets

(56) References Cited

U.S. PATENT DOCUMENTS

2012/0117157 A1* 5/2012 Ristock ............... G06Q 10/10
 709/205
2012/0173687 A1* 7/2012 Brown ............... H04L 41/0266
 709/223

OTHER PUBLICATIONS

Forums, HOA discussions; Subject: What is considered a quorum of the board; Jan. 21-24, 2009; 8 pages.*
Maurice Herlihy; Dynamic Quorum Adjustment for Partitioned Data; Carnegien-Mellon University; Jun. 1987; 25 pages.*
Kronenberg, et al., "VAXClusters: A Closely-coupled Distributed System" In Journal of ACM Transactions on Computer Systems, vol. 4, Issue 2, May 1986, pp. 130-146.

* cited by examiner

DYNAMIC QUORUM FOR DISTRIBUTED SYSTEMS

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Interconnected computing systems can often be used as a distributed system, where nodes (i.e., individual computing systems) in the distributed system work together to perform a coordinated computing task. Some systems allow nodes in a distributed system to vote on whether or not to perform an action. A quorum is the minimum number of votes needed to allow a proposed action to be performed by the distributed system. A typical quorum is a number of nodes that is a majority of configured nodes for the distributed system. However, if the number of active nodes in a distributed computing system falls below the number needed for a quorum, the distributed computing system may be made unable to perform any meaningful functions. While the distributed computing system may have sufficient resources to perform functions, the inability to achieve a quorum would render the distributed system unable to come to an agreement as to any functions.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment herein is directed to an embodiment practiced in a distributed computing environment. The embodiment includes a method of managing a distributed system. The method includes determining a change to a voter's level of participation in a cluster. A quorum of voters changes the voter's voting privileges, based on the change in the voter's level of participation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein implement a dynamic quorum which allows for dynamically adjusting a quorum value of the cluster nodes or quorum witnesses based on the state of the cluster node or quorum witnesses. This can help to ensure cluster survival when the total number of active votes (cluster nodes or cluster quorum witnesses) falls below a pre-specified default or original quorum value. This can help to prevent a cluster from going down if the number of active votes in the cluster falls below a fixed default quorum value.

Embodiments may implement a dynamic quorum which is a feature that helps adjust the quorum value of a cluster to help achieve higher cluster availability even when the number of nodes or votes is below a default quorum value. Such a cluster could sustain more node crashes and could continue to run a workload for longer duration than in cases without dynamic cluster quorum adjustments that would have taken clusters down. In some embodiments, by preventing the cluster from going down, administrators may have an opportunity to connect to the cluster and take corrective actions when it is determined that nodes in the cluster are going down.

In some embodiments, using a dynamic quorum is an opt-in feature where customers explicitly enable dynamic quorum using a cluster property. In the examples illustrated herein, the opt-in feature is enabled by using the example cluster property illustrated as 'EnableDynamicQuorum'. However, other properties or mechanisms could be used. When customers enable the dynamic quorum feature, a cluster service starts to dynamically manage votes assigned to individual nodes based on their current state and cluster membership status.

With a dynamic quorum enabled, when a cluster node goes out of cluster membership, the remaining nodes in the cluster membership dynamically reduce the out-going node's vote to be 0. This dynamic reduction of node's vote allows for adjusting (in this case lowering) the required number of quorum of votes. When the required number of quorum of votes is reduced, the cluster can then sustain even more nodes leaving cluster membership than other systems might allow.

Similarly, when a node joins the cluster membership with dynamic quorum enabled, the nodes in the cluster membership dynamically assign a vote of 1 to the node that joins the cluster. This ensures cluster quorum value is calculated correctly when a different node leaves cluster membership.

Figure 1:
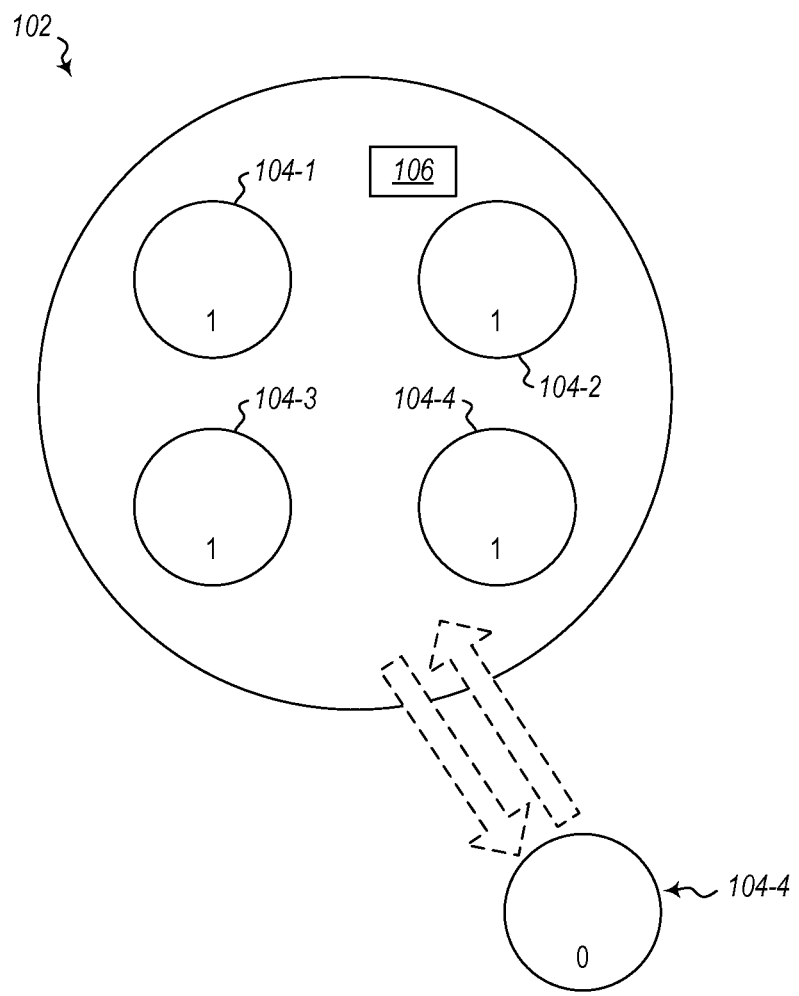
FIG. 1 illustrates an example of a node joining and leaving a cluster.

Referring now to FIG. 1, an example is illustrated. Consider a cluster 102 running with 4 nodes 104-1, 104-2, 104-3, and 104-4. Each of the nodes 104-1, 104-2, 104-3, and 104-4 has a vote of 1 as illustrated. The quorum value for this cluster in this particular example is 3. Three nodes make up a majority of the nodes. One of the nodes 104-4 may crash or otherwise leave the cluster 102. This reduces the number of nodes in active cluster membership down to 3. Without dynamic quorum, one extra node crash would take down the cluster as there would not be 3 votes for a quorum in the cluster 102. With dynamic quorum, the remaining three nodes in the cluster remove the vote of the out-going node, as illustrated by the phantom representation of the node 104-4 having a vote of 0. This brings the quorum value down to 2. Thus, the dynamically adjusted cluster 102 can now sustain one extra node crash before taking the cluster 102 down.

Some embodiments may be implemented such that dynamically adjusted quorum values do not go below a minimum of 2 votes. This may be important in some cases with two nodes having a quorum value of 2 in that no one node can effectively infer that it can continue to run and host the workload.

In the case of a Node-Disk majority quorum model, with witnesses it may possible for one node to go down and still maintain the minimum 2 votes. The following illustrates quorum configurations with witnesses. In one example, a witness gets a vote, just like a node, and thus there are N+1 votes in the system, where N is number of nodes. A quorum is a majority of configured voters. Dynamic quorum principles apply to this configuration as described previously in that either nodes or witness can leave the system. The system could still have sufficient resources to perform functions, but previously, the inability to form quorum renders it useless. However, consider a cluster 102 running with 4 nodes 104-1, 104-2, 104-3, 104.4 and configured with a quorum disk witness. The quorum value for this cluster in this particular example is 3. Two of the nodes 104-3 and 104-4 may crash or otherwise leave the cluster 102. With dynamic quorum, the remaining two nodes in the cluster remove the vote of the out-going nodes, as illustrated by the phantom representation of the nodes 104-3 and 104-4 having a vote of 0. This brings the quorum value down to 2. The quorum disk witness itself has a vote. Thus, the dynamically adjusted cluster 102 can now sustain one extra node crash before taking the cluster 102 down.

However, other embodiments may allow the quorum value to go below 2. In one example, when only two nodes remain, the two remaining nodes will select one of the nodes to have a vote value of 1 and the other node to have a vote value of 0. In this case, if the node with the vote value of 0 goes down, the cluster can continue to operate with the single node with the vote value of 1 performing the cluster functionality. However, if the node with the vote value of 1 goes down, the cluster will be essentially disabled and unable to perform further cluster functionality.

Some embodiments may be implemented in the context of a node shutdown. Dynamic vote adjustment can be extended to handle clean node shutdown. For example, and with reference to FIG. 1, in the case of clean node shutdown, the node 104-4 that is being shutdown will announce to the nodes 104-1, 104-2, and 104-3 in current cluster membership about its departure and the remaining nodes 104-1, 104-2, and 104-3 would mark the shutting node's vote to 0. This allows, for example, for an administrator or some automated tool to shutdown nodes still allow for cluster to keep on running below the default quorum of votes. When the administrator or an automated tool starts the node 104-4, and the started node 104-4 joins back in the cluster, the newly joined node's vote is again increased to 1. For example, an administrator or some automated tool may wish to shutdown nodes during off-peak hours but not completely disable the cluster. This would allow this functionality to be accomplished.

Some embodiments may have functionality for conditions related to complete cluster shutdown. When an administrator explicitly chooses to shut the cluster down, some embodiments may identify this situation as a special condition. In such embodiments the cluster service will not change node votes but rather continue to shut down the cluster. Thus, for complete cluster shut-down, the dynamic quorum functionality can be over-ridden.

The following now illustrates a very specific example. It should be noted that other embodiments may use alternative components or alternative functionality. As noted, some embodiments may explicitly enable dynamic quorum functionality to allow for changing quorum values. Further, some embodiments may include a daemon, illustrated herein as a Dynamic Quorum Daemon (DQD) 106. A daemon is a piece of software that carries out background tasks. In some embodiment, the DQD could be implemented as a background application running on each of the nodes 104-1, 104-2, 104-3 and 104-4. In the illustrated example, after enabling dynamic quorum by setting EnableDynamicQuorum cluster property to 1, the DQD 106 is activated. In the illustrated example, the DQD 106 wakes up every 5 seconds or earlier if an interesting event has occurred. Such interesting events may include system failures, requests to join a cluster, etc. When awake, the DQD 106 checks to see if there are any adjustment to node votes that are to be made. For example, votes can be removed for nodes that have left or are leaving the cluster 102 and/or votes can be given to nodes that have joined or are joining the cluster 102. After performing adjustments to node votes, the DQD 106 checks again to determine any interesting events have occurred since waking. If none have occurred, the DQD 106 goes back to sleep.

For correctness it is sufficient to either wake up DQD 106 on a timer, or on interesting events. However, it may be useful to use both as due to oversight or code changes embodiments may miss a particular interesting event leaving a hole in the algorithm. Using a timer (in the current example, a five second wake timer) guarantees that vote adjustments will be made. Waking on interesting events allows the DQD 106 to exhibit faster reaction times.

The DQD 106 can be used to handle unexpected shutdown of nodes or even the entire cluster. However in some embodiments, the DQD 106 does not perform any vote adjustment of a node if that node started a graceful node shutdown. Similarly, in some embodiments, the DQD 106 does not perform any vote adjustments when a graceful cluster shutdown begins. Rather, prior to graceful node or cluster shutdown, the nodes themselves will propose that gracefully shutting down nodes, or all nodes in the cluster in the case of a cluster shutdown, have their vote set to 0. One exception to this may be when a node is the last quorum vote, in which case, the entire cluster may be gracefully shutdown.

The following table lists interesting events, in some embodiments, that wake up DQD 106 and the DQD's actions for such events. Changes to a node's vote by DQD is done when the rest of the cluster is active.

| Event | Action |
| --- | --- |
| Node has finished joining and reported a node-up event | DQD on the joining node will adjust its vote from 0 to 1 |
| The set of downed nodes has changed | Lowest number node with active cluster membership will bring downed nodes vote to zero, one by one |
| An event signals the quorum was reacquired due to a previously inaccessible witness device now being accessible | DQD on every node evaluates if any vote adjustments need to be done |
| Node added to the quorum configuration/node removed from the quorum configuration/ witness device changed | DQD on every node evaluates if any vote adjustments need to be done |

Various rules may be implemented for determining how vote is adjusted. The following illustrates nine rules used for vote adjustment performed by the DQD 106:

Rule 1: When a cluster 102 is one off quorum, where a cluster is configured with a witness/quorum resource and the witness/quorum device is temporarily inaccessible and regaining the access to quorum device will bring cluster to quorum, no vote adjustments are performed.

Rule 2: When cluster is in a fix quorum mode, when an administrator has manually overridden the quorum configuration and forced the system to run despite not achieving a quorum of vote, no downward vote adjustments are made. For example, a cluster can have a fixed quorum number specified.

Rule 3: DQD 106 does not bring a vote of a node to 1 if a target vote of the node is set to 0. In particular, if an administrator indicates that a node should have a vote of 0, the dynamic quorum system will not force the vote of the node to 1. An administrator can configure a node to not have a vote in quorum (irrespective of dynamic quorum), even though it is participating in the system. The vote that the node is configured to have (either by default or because changed by the administrator) is the "target vote". The vote that the node currently has, perhaps because its vote was removed by DQD when it left the system is the "actual node vote". The purpose of this rule is to say that, if an administrator configures a node to have no vote in the quorum configuration, then the DQD respects the administrator's wishes and does not increase the node's vote. The node's target vote in this case is 0. If an administrator configures a node to always have a vote in the quorum configuration, then the DQD respects the administrator's wishes and does not bring the vote of the node down in case the node is no longer part of active cluster/system.

Rule 4: DQD 106 operates on the actual node vote. DQD 106 does not change the target vote of a node.

Rule 5: A node, when up, will always try to independently bring its own vote to its target vote. This can be done by the node proposing to the quorum that its vote be adjusted by the quorum to its target vote.

Rule 6: Prior to a graceful shutdown, a node will bring its own vote to 0, unless this will result in 0 votes in the cluster, in which case, entire cluster is shutdown.

Rule 7: An active node in a set of active nodes is elected and is responsible for bringing votes of downed nodes to zero one at a time. In one embodiment, this may be done using nodes that have unique ids that can be numerically compared such that the numerically lowest id node can be elected. For this rule, there is one node in the set of active nodes designated to initiate the adjustment of weights of down nodes. Which nodes this is can be arbitrary, so long as all active nodes agree on which node it is. Choosing the numerically lowest id is a very simple deterministic way to reach this agreement.

Rule 8: During graceful cluster shutdown, vote node adjustment by the dynamic quorum system should be avoided Rule 9: If a witness is configured, the DQD 106 does not bring the total of all node votes in the cluster to below 2.

Embodiments may allow for manual vote adjustment. In particular, manual vote adjustment may be allowed while dynamic quorum is enabled. For example, the DQD 106 will honor administrator request to keep a node vote at zero.

If a target vote is set by an administrator to zero, in some embodiments DQD 106 will not change node weigh. If target vote is not set or set to 1, DQD 106 is free to adjust actual node vote as needed. DQD 106 does not change the target vote.

Embodiments may include functionality to fix (or force) quorum mode. In these embodiments, when a cluster is started in a fixed quorum, the DQD 106 will not adjust missing node votes down to zero. To exit fixed quorum mode, the administrator brings enough nodes up and/or adjusts the target votes of other nodes as needed.

Various embodiments may include various features such as those illustrated below.

Embodiments may dynamically remove the quorum vote of a cluster node in case of a node crashing, a node shutting down (either gracefully or otherwise) or a provisioned node that is supposed to join a cluster not joining the cluster during cluster formation.

Embodiments may dynamically remove quorum vote of quorum witness in a case of permanent failure of the quorum witness or if the quorum witness is persistently offline.

Embodiments may dynamically add quorum vote to a cluster node in the case of the cluster node successfully joining the cluster.

Embodiments may dynamically add quorum vote to a quorum witness in the case where the quorum witness successfully joins a quorum after permanent failure of the witness or after the witness has been persistently offline.

Embodiments may include a property (such as Enable-DynamicQuorum illustrated above) to enable/disable dynamic quorum functionality.

Embodiments may include Dynamic Quorum Vote per Cluster Node or Quorum Witness

Embodiments may include interaction with existing quorum policies. Such policies may include Node-Majority with Disk Witness, Node-Majority with File Share Witness, Simple Node-Majority. Clusters may support various types of quorum witnesses and dynamic quorum functionality can be applied to any type of quorum witness supported by the cluster. In particular, dynamic quorum can be applied to a majority quorum configuration with or without a witness. There can be different kinds of witnesses, so long as the implementation of the quorum mechanism has the ability to associate the witness with a vote. Typically this means the witness can store data. Further, there can be multiple witnesses Embodiments may include interaction with manual quorum vote assignments. In particular, embodiments may be designed to allow administrators to manually set a nodes quorum vote level. In some embodiments, the dynamic quorum functionality will not change this manually assigned level. Similarly, embodiments may include interaction with a fixed quorum mode or a forced quorum mode already supported by the cluster.

Embodiments may include disallowing dynamically removing quorum votes in the case of entire cluster shutdown.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
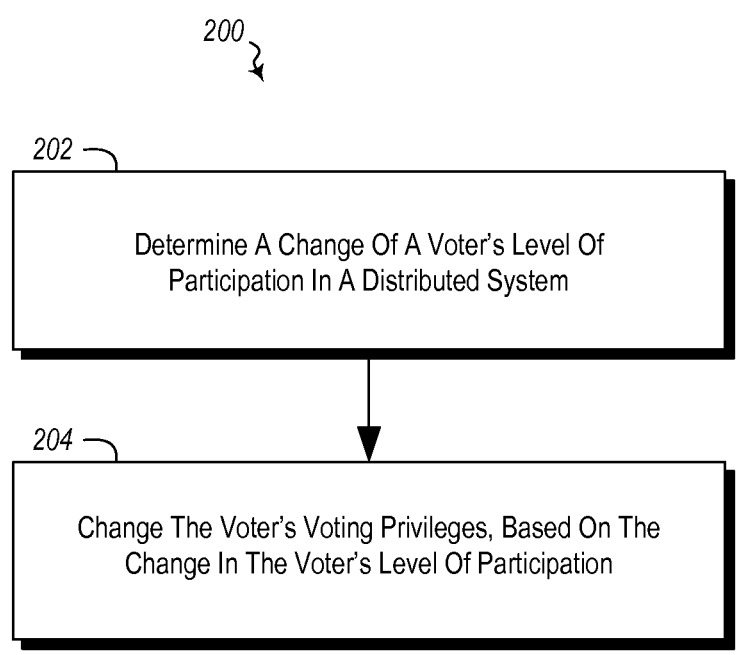
FIG. 2 illustrates a method of managing a distributed system.

Referring now to FIG. 2, a method 200 is illustrated. The method 200 may be practiced in a distributed computing environment and includes acts for managing a distributed system. The method includes determining a change of a voter's level of participation in a distributed system (act 202). A voter may be at least one of a node or a witness device. To be a witness device, nodes are able to store data on the device. A witness is most useful if all nodes can access it (not necessarily simultaneously, but in case one node accessing the device fails, another should be able to take over). Otherwise, the witness may still be a single point of failure if it is only able to communicate with a single node. A disk is a good witness, especially if it is "physically" shared such that it is accessible from multiple nodes by some shared storage bus, such as fibre channel, iSCSI, Serial Attached SCSI, etc. A file share is another example of a device that may be used for a witness. As another example, a web server can be a witness if it can store data on behalf of nodes. For example, the web server may support an HTTP PUT or other command enabling it to store data on behalf of nodes.

One example of a distributed system includes a cluster system. A voter's may have its level of participation I the distributed system changed in a number of different ways. For example, the voter may leave the distributed system. Alternatively, the voter may join the distributed system. Alternatively, the voter may become actively leaving the distributed system. Alternatively, the voter may become actively joining the distributed system.

The method 200 further includes a quorum of voters changing the voter's voting privileges, based on the change in the voter's level of participation (act 204). As will be described further below, voters can have their voting privileges changed by either being awarded a vote or having a vote removed. An example of this is illustrated in FIG. 1 where node 104-4 has its votes changed depending on changes to the node's participation level in the cluster 102.

The method 200 may be practiced where determining a change of a voter's level of participation in a distributed system includes determining a node is no longer part of the distributed system. In this example, changing the voter's voting privileges includes removing the node's vote.

The method 200 may be practiced where determining a change of a voter's level of participation in a distributed system includes determining a node has been added to the distributed system. In this example, changing the voter's voting privileges includes giving the node a vote.

The method 200 may be practiced where determining a change of a voter's level of participation in a distributed system includes determining that the node is leaving distributed system. The quorum of voters changing the voter's voting privileges includes removing the node's vote. This includes the node itself as part of the quorum voting to remove its own vote to reduce the number of nodes needed for a quorum in the distributed system. In some embodiments, the node that is leaving in a graceful shutdown scenario may propose to the quorum that its vote be removed as part of the graceful shutdown.

The method 200 may further include determining that only two nodes remain in the quorum. In some embodiments, the method 200 may, as a result, deterministically selecting one of the nodes to lose its vote and one of the nodes to retain its vote. As noted, if the node that was selected to retain its vote were to go down, then the entire distributed system would be unable to perform actions that require quorum. However, if the node that was selected to lose its vote were to go down, then the distributed system could continue to function. This may also apply when distributed systems have more than two nodes in active membership, but due to administrator setting explicitly intended/target votes of other nodes to zero, embodiments have only two nodes with votes.

The method 200 may further include receiving user input and as a result adding or removing votes from one or more nodes. In particular, embodiments may allow for an administrator to manually add or remove votes. Thus, dynamic adjustments may be made to the quorum as well as manual adjustments.

The method 200 may further include determining that the quorum comprises three voters including two nodes and one device. One of the nodes leaves the distributed system and as a result, the method 200 includes determining not to remove the node's vote based on determination that the quorum previously comprised three voters including two nodes and one device.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a distributed computing system in which performance of a computing task within the distributed system is based at least in part upon each of a minimum number of nodes or devices providing authorization for performance of the computing task, a method of dynamically managing the minimum number of nodes or devices required to enable performance of the computing task, the method comprising:

instantiating a dynamic quorum daemon in the distributed system, the dynamic quorum daemon running as a background task in the distributed system and the dynamic quorum daemon managing a set of nodes within the distributed system that are enabled to authorize performance of a computing task in the distributed system;

establishing that each of one or more nodes and zero or more devices in the distributed system is designated as an authorizing entity enabled to authorize performance of a computing task in the distributed system;

establishing a minimum number of the authorizing entities which are required to authorize performance of the computing task in order to allow performance of the computing task in the distributed system;

the dynamic quorum daemon determining that a state of a node or device in the distributed system has changed;

based on the determined change in the state of a node or device, the dynamic quorum daemon changing a designation of whether the node or device is an authorizing entity that is enabled to authorize performance of a computing task in the distributed system; and based on the change of the designation of the node or device, the dynamic quorum daemon adjusting the minimum number of authorizing entities which are required to authorize performance of a computing task in order to allow performance of the computing task in the distributed system, the adjustment of the minimum number of authorizing entities being based at least in part upon a quorum policy which comprises one of node-majority with disk witness or node-majority with file share witness.

2. The method of claim 1, wherein determining a change of a state of a node or device comprises:

determining the node or device is no longer part of the distributed system; and changing the designation of the node or device to indicate that the node or device is not an authorizing entity.

3. The method of claim 1, wherein determining a change of a state of a node or device comprises determining a node has been added to the distributed system and changing the designation of the node or device to indicate that the node or device is an authorizing entity.

4. The method of claim 1, wherein determining a change of a state of a node or device comprises determining that a node is leaving the distributed system and wherein changing the designation of the node or device comprises removing the node or device from the authorizing entities and reducing the minimum number of authorizing entities which are required to authorize performance of a computing task.

5. The method of claim 1, further comprising determining that only two nodes remain as authorizing entities and, as a result, deterministically selecting one of the two remaining nodes to lose its designation as an authorizing entity.

6. The method of claim 1, further comprising receiving user input and, as a result, removing designation as an authorizing entity from one or more nodes.

7. The method of claim 1, further comprising receiving user input and, as a result, designating one or more nodes as authorizing entities.

8. The method of claim 1, further comprising:

determining that the minimum number comprises two nodes and one device;

determining that one of the two nodes leaves the distributed system; and as a result, determining not to remove designation of the node leaving the distributed system based on determination that the minimum number previously comprised three authorizing entities including two nodes and one device.

9. A computer program product for performing a method in a distributed computing system wherein performance of a computing task within the distributed system is based at least in part upon each of a minimum number of nodes or devices providing authorization for performance of the computing task, the method for dynamically managing the minimum number of nodes or devices required to enable performance of the computing task, the computer program product comprising one or more computer readable storage devices comprising computer executable instructions that when executed by one or more processors cause the one or more processors to perform the following:

instantiating a dynamic quorum daemon in the distributed system, the dynamic quorum daemon running as a background task in the distributed system and the dynamic quorum daemon managing a set of nodes within the distributed system that are enabled to authorize performance of a computing task in the distributed system;

establishing that each of one or more nodes and zero or more devices in the distributed system is designated as an authorizing entity enabled to authorize performance of a computing task in the distributed system;

establishing a minimum number of the authorizing entities which are required to authorize performance of the computing task in order to allow performance of the computing task in the distributed system;

the dynamic quorum daemon determining that a state of a node or device in the distributed system has changed;

based on the determined change in the state of a node or device, the dynamic quorum daemon changing a designation of whether the node or device is an authorizing entity that is enabled to authorize performance of a computing task in the distributed system; and based on the change of the designation of the node or device, the dynamic quorum daemon adjusting the minimum number of authorizing entities which are required to authorize performance of a computing task in order to allow performance of the computing task in the distributed system, the adjustment of the minimum number of authorizing entities being based at least in part upon a quorum policy which comprises one of node-majority with disk witness or node-majority with file share witness.

10. The computer program product of claim 9, wherein determining that a state of a node or device in the distributed system has changed comprises
    determining the node or device is no longer part of the distributed system; and
    changing the designation of the node or device to indicate that the node or device is not an authorizing entity.

11. The computer program product of claim 9, wherein determining that a state of a node or device in the distributed system has changed comprises determining a node has been added to the distributed system and changing the designation of the node or device to indicate that the node or device is an authorizing entity.

12. The computer program product of claim 9, wherein determining that a state of a node or device in the distributed system has changed comprises determining that a node is leaving distributed system and wherein the quorum of voters changing the voting privileges comprises removing the node's vote including the node itself as part of the quorum voting to remove its own vote to reduce the number of nodes needed for a quorum in the distributed system.

13. The computer program product of claim 9, further comprising determining that only two nodes remain as authorizing entities and, as a result, deterministically selecting one of the two remaining nodes to lose its designation as an authorizing entity.

14. The computer program product of claim 9, further comprising receiving user input and, as a result, removing designation as an authorizing entity from one or more nodes.

15. The computer program product of claim 9, further comprising receiving user input and, as a result, designating one or more nodes as authorizing entities.

16. The computer program product of claim 9, further comprising:
    determining that the minimum number comprises two nodes and one device;
    determining that one of the two nodes leaves the distributed system; and
    as a result, determining not to remove designation of the node leaving the distributed system based on determination that the minimum number previously comprised three authorizing entities including two nodes and one device.

17. A distributed computing system wherein performance of a computing task within the distributed system is based at least in part upon each of a minimum number of nodes or devices providing authorization for performance of the computing task, the system configured to dynamically manage the minimum number of nodes or devices required to enable performance of the computing task, the system being configured to:

instantiate a dynamic quorum daemon in the distributed system, the dynamic quorum daemon running as a background task in the distributed system and the dynamic quorum daemon managing a set of nodes within the distributed system that are enabled to authorize performance of a computing task in the distributed system;

establish that each of one or more nodes and zero or more devices in the distributed system is designated as an authorizing entity enabled to authorize performance of a computing task in the distributed system;

establish a minimum number of the authorizing entities which are required to authorize performance of the computing task in order to allow performance of the computing task in the distributed system; and the dynamic quorum daemon being further configured to determine that a state of a node or device in the distributed system has changed, wherein the change of state is one of having left the distributed system, actively leaving the distributed system, having joined the distributed system, or actively joining the distributed system;

based on the determined change in the state of a node or device, change a designation of whether the node or device is an authorizing entity that is enabled to authorize performance of a computing task in the distributed system; and based on the change of the designation of the node or device, adjust the minimum number of authorizing entities which are required to authorize performance of a computing task in order to allow performance of the computing task in the distributed system, the adjustment of the minimum number of authorizing entities being based at least in part upon a quorum policy which comprises one of node-majority with disk witness or node-majority with file share witness.

18. The system of claim 17, wherein determining that a state of a node or device in the distributed system has changed comprises:
   determining the node or device is no longer part of the distributed system; and
   changing the designation of the node or device to indicate that the node or device is not an authorizing entity.

19. The system of claim 17, wherein determining that a state of a node or device in the distributed system has changed comprises determining a node has been added to the distributed system and changing designation of the node or device to indicate that the node or device is an authorizing entity.

20. The system of claim 17, wherein
   determining that a state of a node or device in the distributed system has changed comprises determining that the node is leaving distributed system and
   wherein changing the designation of the node or device comprises removing the node or device from the authorizing entities and reducing the minimum number of authorizing entities which are required to authorize performance of a computing task.

* * * * *